Patented Nov. 21, 1950

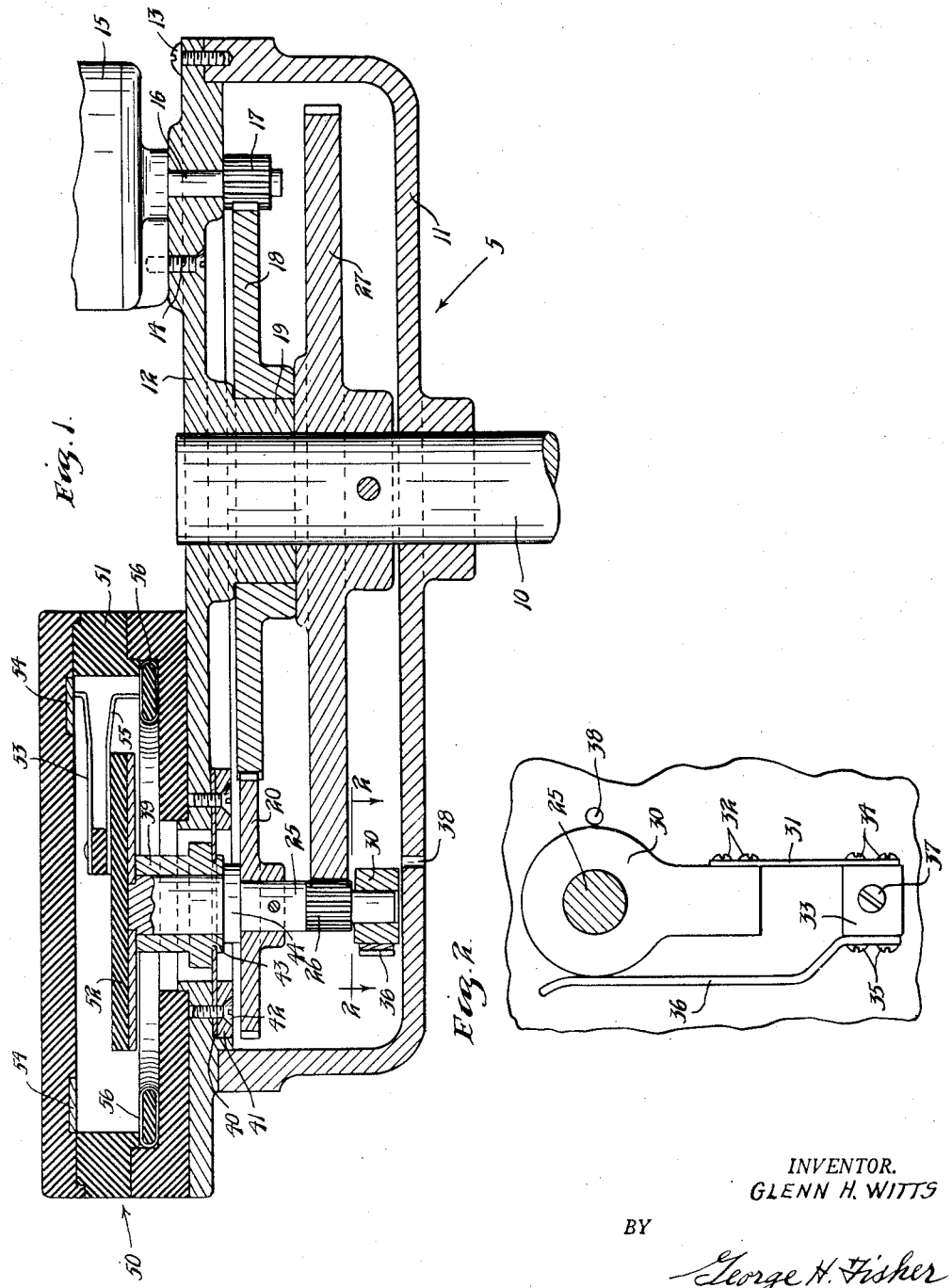

2,531,241

UNITED STATES PATENT OFFICE 2,531,241

REMOTE CONTROL DEVICE

Glenn H. Witts, Minneapolis, Minn., assignor to Minneapolis-Honeywell Regulator Company, Minneapolis, Minn., a corporation of Delaware Application May 31, 1945, Serial No. 596,951

7 Claims. (Cl. 318—15)

My invention relates to a remote control device in which the location of a sensitive driven member is accurately positioned in response to a remote signal. In particular, it is concerned with an electrically operated device intended to accurately position a driven member in response to a degree of unbalance in a normally balanced electrical system wherein a control member, such as a balancing potentiometer or the like, is moved in unison with the driven member until the system is electrically rebalanced. In order that such a control device be effective, it is highly important that the movement of the operative portion of the control member and the driven members be accurately coordinated.

In the present device, a motor and gear train are provided for moving a potentiometer and the driven member in response to a remote control signal which unbalances an electrical network in a manner generally shown in Patent 2,028,110 to Taylor, and Patent 2,160,400 to Cunningham. A gear train is provided to give a very substantial speed reduction between the motor and the potentiometer and a still further speed reduction to the driven member. In such a gear train having a number of movable members necessary to give a high ratio of speed reduction, there is likely to be a certain amount of backlash which results from imperfections of the gear teeth, lack of concentricity of the circular gear wheels, or as a result of wear of the various parts of the mechanism. In a particular application for which the present device is utilized, the ratio of speed reduction between the motor and the final driven member is in the neighborhood of 10,000 to 1 and it will be understandable therefore, that a high degree of accuracy and final stability of the driven member is imperative. Since the operation of the motor is controlled by a follow up potentiometer or the like, to obtain a rebalanced condition of the electrical network, it is also important that the final position of the movable portion of the electrical control member be both accurate and stable. As a novel feature of the present device, I have provided means for preventing any undesired movement or backlash which may exist in the gear train from affecting the correct positioning or stability of either the movable portion of the potentiometer or the final driven member.

One object of my invention is to provide a remote control device for accurately positioning a driven member in response to a condition of unbalance in a normally balanced electrical system.

Another object is to provide in a control device having a gear train, means for preventing backlash between certain geared members.

Another object is to provide a means of flexibly mounting a drive shaft of a gear train within a supporting casing so that one end of the shaft is movably controlled to overcome imperfections in certain members of the gear train, and the opposite end of the shaft is flexibly mounted to compensate for any movement caused by the imperfections in certain members of the aforesaid gear train.

A further object is to provide in an arrangement of two gears which are in driving and driven relationship, means for maintaining said gears in mesh with each other irrespective of lateral movement of one of said gears.

Other and further objects will become apparent from a reading of the following description and claims and from an examination of the appended drawing in which:

Figure 1 is an elevation partly in cross section of a control device in which the invention is applied; and Figure 2 is a side elevation taken on the line 2—2 of Figure 1, of one of the flexible bearing members.

Referring to the drawing, a remotely controlled device indicated by the general reference numeral 5, is provided to accurately position a final driven member 10 in response to a remote signal which causes an unbalanced condition in a normally balanced electrical system. A movable portion 52 of a follow up potentiometer indicated by the general reference numeral 50, moves in unison, but at a different rate of speed than the member 10, to rebalance the electrical system, to thereby terminate movement of the final driven member at an accurately designated point in its axis of rotation. It is highly important that the final or arrested position of the shaft 10 be accurately controlled and that it be free of any movement which might result from looseness of parts or imperfections in the gear train, even when well made gears are used. To accomplish this result, the device will now be explained in detail.

A generally cup-shaped casing 11 is provided to contain the moving elements of the mechanism and is enclosed by a cover member 12, which is secured to the casing 11 by screws 13. An electric motor 15 having a drive shaft 16 is mounted on the cover member 12 and is secured thereto by screws 14. Fastened to the drive shaft 16 is a spur gear 17 which drives gear 18. Gear 18 freely rotates on a bearing 19 about the driven shaft 10 and is in turn in meshing engagement with a smaller spur gear 20. Gear 20 is fastened to an intermediate shaft 25 as is also a smaller pinion gear 26 which drives a larger gear 27. Gear 27 may be regarded as the final driven gear of the train, and is fastened to the sensitive driven shaft 10. With well made gears, such as 26 and 27 are assumed to be, the normal clearance permits sufficient lateral movement to eliminate all backlash. Of course, the clearance can be increased slightly, if desired. Insofar as the foregoing description of the gear train is concerned, it should be understood that this is merely an example of means for securing speed reduction between motor 15 and the intermediate shaft 25 and a still further speed reduction of driven shaft 10. The gears may be of any desired number and need not necessarily be spur gears, but in a particular application, I have used a sufficient number of spur gears to secure a speed reduction between shafts 16 and 10 to obtain a ratio of speed reduction in the neighborhood of 10,000 to 1. From such a ratio of speed reduction, it should be apparent that the degree of rotation of the shaft 10 is critical, and it is highly important that its terminal position as the result of any one operation of motor 15 be exact and free of any backlash resulting from imperfections in the gear train.

The intermediate shaft 25 serves to coordinate the movement of the potentiometer wiper with the driven shaft 10. Throughout the gear train until intermediate shaft 25 is affected, backlash is not important, and no attempt is made to control it, but as movement of this member affects the ratio between the potentiometer and the driven shaft 10, it is important that backlash be eliminated at this point. To accomplish this result intermediate shaft 25 is mounted at one end in a flexible bearing 30. Referring now to Figure 2, bearing 30 is provided with a movable mounting by a flexible reed 31, which is secured to bearing 30 by screws 32, and to a supporting member 33 by screws 34. Also attached to the supporting member 33 by screws 35 is a resilient leaf spring 36 which has a portion in biasing engagement with the bearing 30. Spring 36 is provided with sufficient resiliency to bias bearing 30 and the intermediate shaft 25 to the right as shown in Figure 1 so that the gear 26 is always in firm engagement with gear 27, the necessary slight lateral movement of gear 26 being permitted by the clearance of the gears. It should be understood from the nature of this resilient flexible engagement between gears 26 and 27 that this arrangement will provide compensation for any irregularity which may exist between the surfaces of these members. The bearing 30 and its associated parts are shown as being mounted on the inner surface of the casing 11 by the screw 37 which fastens member 33 to the casing. In order to obtain alignment between the shaft 25 and bearing 30 in assembling the device, a small pin 38 is temporarily inserted in the casing 11 to aid in alignment of the bearing with respect to the shaft and it should be understood that this pin 38 would be normally removed after the bearing had been properly aligned so as to permit free movement of the bearing thereafter.

As any movement of intermediate shaft 25 within bearing 30 must be compensated for at its opposite end, this is accomplished by mounting said opposite end within a bearing 39 which is in turn centrally supported within a flexible diaphragm 40. The diaphragm 40 is secured between the cover 12 and a ring structure 41 by fastening means 42, and the diaphragm is secured in bearing 39 by a turned over portion 43. A spacer 44 separates the turned over portion 43 from the gear 20. The flexible diaphragm 40 and its associated parts, together with bearing 30 and its associated parts, provide a resilient or floating support for the intermediate shaft 25, and these assemblies coacting with each other, compensate for any backlash in the gear train or any complex convolutions of the intermediate shaft 25, and thus serve to keep the final driven shaft 10 in exact coordinated movement with the wiper portion of the potentiometer.

An electrical balancing device which might be a magnetic pick up, a capacitor, or the like, but which is shown as a variable resistor or potentiometer, indicated by the general reference numeral 50, is mounted on cover 12 adjacent the end of intermediate shaft 25. The potentiometer 50 consists of an insulating wall structure 51 within which is positioned an inner rotative portion 52 which is fastened to shaft 25. The movable portion 52 carries one wiper 53 which contacts a ring structure 54 and a second wiper 55 which contacts a wire wound resistance 56. The potentiometer is of the "follow up" type and is intended to rebalance an electrical bridge circuit which is capable of being placed in an unbalanced condition by a remote signal. The operation of a balancing electrical control member such as a potentiometer is well understood by those skilled in the art and it is customarily understood that when the circuit has become rebalanced by the control member, operation of motor 15 is terminated. It will be observed that the relationship of the resilient wipers 53 and 55 with their respective contacting surfaces 54 and 56 is such that lateral or angular movement of the rotatable portion 52 will not disturb the electrical contacting surfaces. Thus, movement of shaft 25 in its flexible bearings will have no undesirable effect upon the proper operation of the potentiometer.

In operation, upon receiving a remote electrical signal, the motor 15 will operate until the control 50 has produced a balanced electrical condition which will terminate operation of motor 15. Operation of motor 15 will cause rotation of the gear train including the intermediate shaft 25, the movable portion 52 of the control 50, and the final driven shaft 10. The leaf spring 36 biases the bearing 30 and shaft 25 to the right as shown in Figure 1, so that pinion gear 26 is in firm engagement with the final driven gear 27 to thus prevent backlash between these members. In the event of any irregularity existing between the gears, and it should be understood that any such irregularity would be very slight, the shaft 25 by reason of its flexible mounting on the reed member 31 and the diaphragm 40, is free to move in either direction to compensate for this irregularity. The movement of shaft 25 would normally be only of a lateral nature, but because of the circular construction of diaphragm 40, the diaphragm will compensate for any movement whatsoever, even though it be of a complex nature.

By providing a flexible floating intermediate member of the type described heretofore, it is possible to coordinate the driven member of a gear transmission with the electrical balancing member to a very high degree of accuracy so that the arrangement may be used in delicate precision instruments of whatever nature as may be desired.

I claim as my invention:

1. In a device of the class described, including, a casing, a driven gear journaled in said casing, a rotatable drive shaft with a pinion mounted thereon located within said casing, said driven gear and said pinion being adapted for meshing engagement with sufficient normal clearance, two flexibly supported bearings carried by said casing to provide floating support for said shaft during lateral movement thereof, one of said bearings being mounted on a flexible reed, and resilient means associated with said bearing for urging said shaft in one direction to provide meshing engagement between said pinion and said driven gear, the other of said bearings being mounted in a flexible diaphragm to provide compensating movement for the opposite end of said shaft when said one end is laterally moved by said resilient means.

2. A device of the class described, including in combination, a motor means, a first and second device movably controlled by said motor means, a connecting linkage between said motor means and said devices comprising a flexibly mounted rotatable shaft, a gear carried by said shaft meshing with a gear carried by said second device, said gear meshing with sufficient normal clearance to permit movement of said shaft toward said second device, and resilient means cooperating with said flexibly mounted shaft to move said shaft in the direction of said second device to thereby prevent backlash between said gears.

3. A control device comprising in combination, an electrically operated motor means, a gear train including a driven gear and a driving gear actuated by said motor means, a driven member operatively connected to said driven gear, control means for controlling the operation of said motor means, a rotatable intermediate shaft carrying a pinion operatively connecting said control means to said driven gear for operation in unison with said driven gear, said intermediate shaft being flexibly mounted to permit lateral movement of said pinion relative to said driven gear, and spring means biasing said pinion into firm engagement with said driven gear for co-ordinating the operation of said driven member and said control means.

4. A control device comprising in combination, motor means, a gear train including a driven gear and a driving gear actuated by said motor means, a driven member operatively connected to said driven gear, control means for terminating the operation of said motor means, a rotatable intermediate shaft carrying a pinion operatively connecting said control means to said driven gear for operation in unison with said driven member, said shaft being flexibly mounted to permit lateral movement of said pinion relative to said driven gear, and biasing means urging said pinion into firm engagement with said driven gear for co-ordinating the operation of said driven member and said control means.

5. In a device of the class described, including, a casing, a rotatable drive shaft located within said casing, flexibly mounted support members carrying bearings for journaling said shaft and providing for lateral movement of one end of said shaft which carries a pinion, one of said flexible support members being a resilient diaphragm, a driven gear journaled in said casing and adapted to mesh with said pinion with sufficient normal clearance, and means for laterally biasing the pinion end of said shaft toward said driven gear.

6. In a device of the class described, comprising in combination, motor means, a gear train including a driven gear and a driving gear actuated by said motor means, a driven member operatively connected to said driven gear, a rotatable intermediate shaft carrying a pinion at one extremity for connecting said driven gear to said shaft and said driving gear at the other extremity, a control device connected to said shaft for operation in unison with said driven member, said intermediate shaft being flexibly mounted at each extremity to permit lateral movement of said pinion relative to said driven gear, and biasing means urging said pinion into firm engagement with said driven gear for co-ordinating the operation of said driven member and said control device.

7. In a device of the class described, in combination; a motor; a casing; a gear train positioned in said casing and including a driven gear, an intermediate shaft and a driving gear actuated by said motor means, said intermediate shaft carrying a pinion at one extremity for connecting said driven gear to said shaft and said driving gear at the other extremity, said intermediate shaft being flexibly mounted at each extremity to permit lateral movement of said pinion relative to said driven gear; a driven member operatively connected to said driven gear; a control device located outside of said casing and connected to said flexibly mounted intermediate shaft for operation in unison with said driven member; a flexible diaphragm positioned in said casing and carrying a bearing for journaling said shaft to provide for flexibly mounting one extremity of said shaft near which said driving gear and said control device are located; and spring means near the other extremity of said shaft biasing said pinion into firm engagement with said driven gear for co-ordinating the operation of said driven member and said control device.

GLENN H. WITTS.

REFERENCES CITED

The following references are of record in the file of this patent:

UNITED STATES PATENTS

| Number | Name | Date |
|---|---|---|
| 106,360 | Hamlin | Aug. 16, 1870 |
| 1,796,992 | Helm et al. | Mar. 17, 1931 |
| 2,007,240 | Crosthwait | July 9, 1935 |
| 2,292,145 | Mercereau | Aug. 4, 1942 |
| 2,302,575 | Romaine et al. | Nov. 17, 1942 |
| 2,348,392 | Kester | May 9, 1944 |